E. A. LUSTER.
MEASURING MACHINE.
APPLICATION FILED APR. 15, 1911.
997,840.
Patented July 11, 1911.
2 SHEETS—SHEET 1.
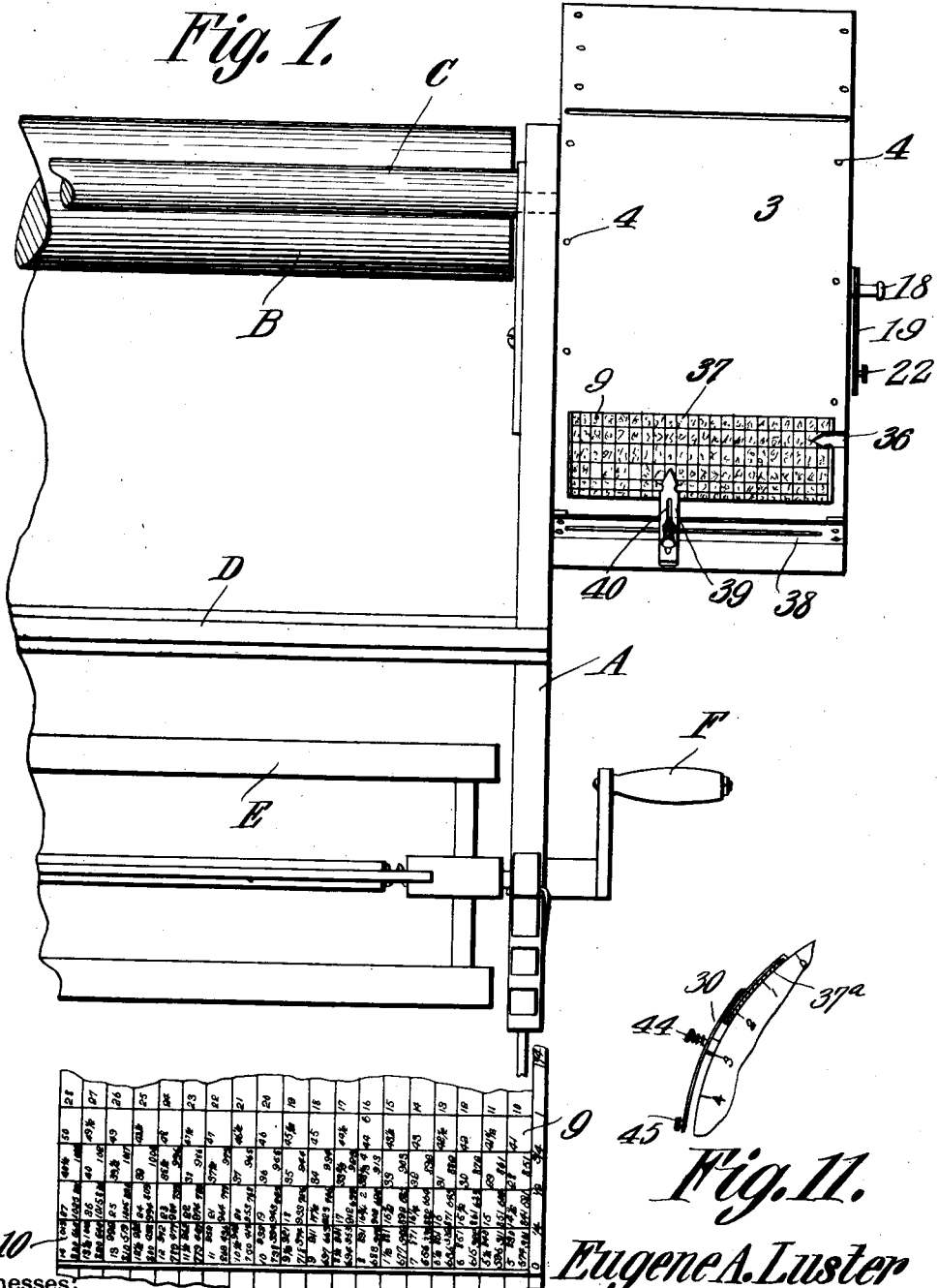
Witnesses:
Frank B. Woodow.
R. M. Elliott.
Eugene A. Luster
Inventor,
by C. A. Snow & Co.
Attorneys.

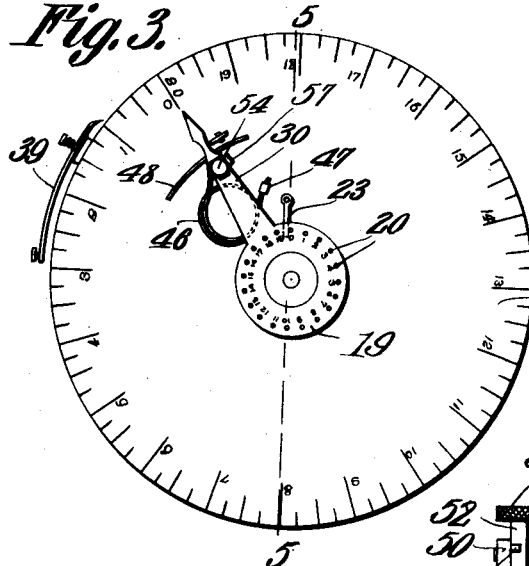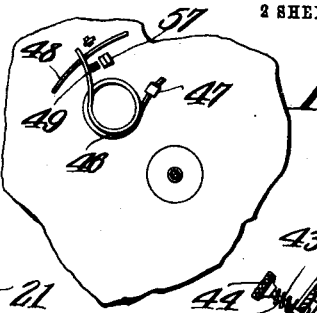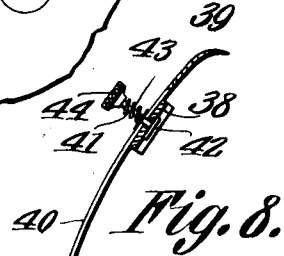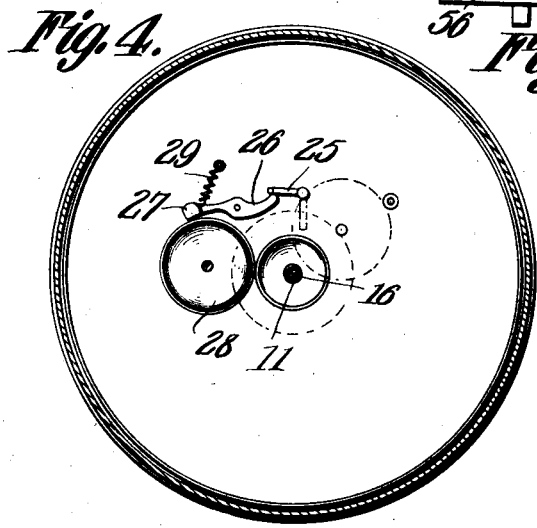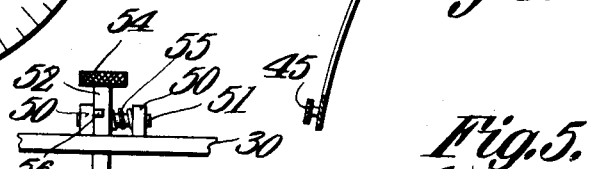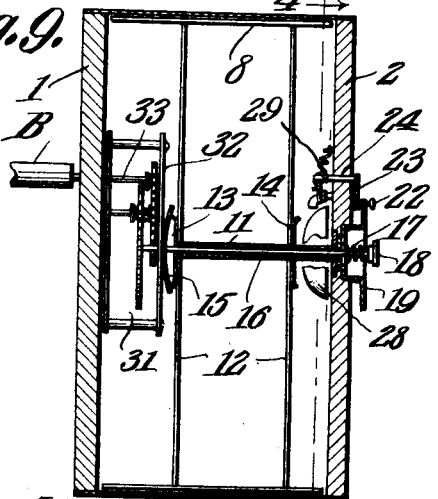

UNITED STATES PATENT OFFICE.

EUGENE A. LUSTER, OF ATHENS, GEORGIA.

MEASURING-MACHINE.

997,840.  Specification of Letters Patent.  Patented July 11, 1911.

Application filed April 15, 1911.  Serial No. 621,374.

*To all whom it may concern:*

Be it known that I, EUGENE A. LUSTER, a citizen of the United States, residing at Athens, in the county of Clark and State of Georgia, have invented a new and useful Measuring-Machine, of which the following is a specification.

This invention relates to measuring and calculating mechanism for cloth dispensing machines.

The object of the invention is in a ready and accurate manner, to measure fabrics in yards and fractions thereof and at the same time to indicate the exact price, whereby likelihood of over or under measuring is practically eliminated and danger of mistakes in calculating the value of the vended article is prevented.

A further object is to simplify the construction of the mechanism, and arrange the parts thereof in such manner as practically, to prevent derangement in use.

With the above and other objects in view as will appear as the nature of the invention is understood, the same consists in the novel construction and combinations of parts of a measuring and calculating mechanism for cloth-dispensing machines, as will be hereinafter further described and claimed.

In the accompanying drawings forming a part of this specification and in which like characters of reference indicate corresponding parts; Figure 1 is a front elevation of a portion of a machine constructed in accordance with the present invention. Fig. 2 is a detail view of the price scale. Fig. 3 is a front elevation of the dial and index hand, showing the setting mechanism used in connection therewith. Fig. 4 is a vertical sectional view taken on the line 4—4, Fig. 5, and looking in the direction of the arrow thereon. Fig. 5 is a vertical sectional view taken on the line 5—5, Fig. 3. Fig. 6 is a sectional detail view showing the means employed for holding the heads of the cylinder assembled. Fig. 7 is a detail view of a portion of the mechanism for returning the index hand to its normal position. Fig. 8 is a detail view in section of the hand or pointer used to designate the price of the goods being sold. Fig. 9 is a fragmental detail view in elevation of a part of the mechanism for setting the index hand. Fig. 10 is a side elevation of the mechanism shown in Fig. 9. Fig. 11 is a detail view of a slightly modified portion of the apparatus.

Referring to the drawings, A designates, generally, a portion of the frame of the machine, B the cloth roll, C the tension roll, D the knife bar and E the reel, and as these parts may be of the usual or any preferred construction, further description thereof is deemed unnecessary.

Secured to one side of the frame of the machine is a cylindrical casing comprising two heads 1 and 2 and a side 3, preferably of metal, the heads being held together by screws 4 which pass through the side and into the head, as shown in Fig. 1. If preferred however, the heads may be secured together by a plurality of metallic clips 5, one of which is shown in Fig. 6, and has at one end an inturned toe 6, seated in the head 1 and at its other end a prong 7 seated in the head 2. Arranged within the cylinder is a drum 8, the periphery of which is provided with a price scale 9 divided into spaces 10, in which will be placed the price of a yard of goods, of one and a quarter, one and a half and one and three-quarters of a yard, each four spaces running circumferentially of the drum completing a yard. Extending through the center of the drum is a hollow shaft 11 which is journaled in two partitions 12 arranged within the drum and also in the head 2. This shaft carries two dished disks 13 and 14, the former of which is designed to engage with a dished disk 15 carried by a shaft 16 arranged within the shaft 11, and the latter to engage with the adjacent partition 12, the series of disks constituting friction plates to prevent the drum 8 from being turned back accidentally. The disks are held in operative contact with the parts with which they coact by a coiled spring 17 mounted on the outer end of the shaft 16 and retained under requisite tension by a thumb nut 18. The outer end of the shaft 16 projects through a dished disk 19 that is countersunk into the head 2, and thus serves to allow the nut 18 to be inset so as to prevent an obstruction. The flange of the disk 19 is provided with a series of orifices 20 that are numbered from 1 to 20 to correspond with the divisions on a dial 21 formed on and carried by the head 2. These orifices are designed to be engaged by an insertible pin 22 that is arranged to engage an arm 23 carried by a shaft 24, journaled in the head 2, the inner end of the shaft having secured to it a second arm 25 of approximate L-shape that is arranged to engage the lever 26 of a bell hammer 27 that is designed to strike a bell 28 and thus give audible notification that the length of fabric has been measured. The lever, as usual, is actuated by a compression spring 29 to cause its hammer to strike the bell or gong after having been tripped by the arm 25. The tripping of the arm is secured by the index hand 30 which constitutes an extension of the disk 19, and the flange of the latter disk is spaced from the face of the head 2, as shown in Fig. 5, in order to permit the hand to be turned without interfering with the arm 23. Suppose it be desired to measure three yards of fabric. Under these conditions the operator would place the pin 22 in the orifice numbered 3 in the disk, and when the hand is turned and reaches the mark 3 on the dial, the bell lever 26 will trip and the gong be sounded.

The mechanism for actuating the index hand from the cloth roll B, consists of a train of gears designated generally 31, that are carried by a suitable frame 32 secured to the head 1, one of the gears being mounted upon a shaft 33 that extends through the rear plate of the frame through the head 1, and is connected with the cloth roll B. Motion is transmitted from the shaft 33 through the train of gears to the shaft 16 and from this to the index hand.

In measuring the length of goods it is necessary first, to set the machine for the price of the goods per yard and this is done by moving the index hand from zero, as shown in Fig. 3, to 1 on the dial, and this will bring the roll of price marks containing the one desired opposite a hand or pointer 36 secured to the side 3 of the casing, the latter being provided with a rectangular opening 37, through which the price scale appears. Below the lower wall of the opening and extending transversely of the cylinder is a longitudinally slotted bar 38 upon which is arranged to slide a pointer 39 having a longitudinal slot 40 through which projects one end of a pin 41 that extends through the slot of the bar 38 and carries on its inner end a head 42 to hold it against disconnection therefrom. Mounted upon the outer portion of the pin is a coiled spring 43 which is maintained under the desired tension by a knurled nut 44 carried by the outer end of the pin. The lower end of the pointer carries a button or knob 45 by which the pointer may be moved upward or downward across the price scale, the spring 43 serving to hold it in its adjusted position. After the index hand 30 has been moved to 1 on the dial and the pointer 39 adjusted to the price, it is essential that the hand 30 be returned to zero again, otherwise, in measuring a quantity of cloth, it would be one yard short. To secure this result automatically in case the operator should fail of his duty, there is a coiled spring 46 provided, one end of which is fixed by a keeper 47 to the outer face of the dial. This spring is coiled into one or more loops and its free end is arranged to bear upon a track 48 also carried by the dial, a stop 49 serving to check the movement of the free end of the spring toward its fixed end. Secured to the upper side of the index hand adjacent its outer end are two ears 50 in which is journaled a shaft 51 upon which is mounted a dog 52 that projects downward through the hand and terminates in a curved toe 53, the upper end of the dog being provided with a knob 54. The shaft 51 carries a coiled spring 55 which bears respectively, against one of the ears 50 and the dog and serves to hold it normally in the position shown in full lines in Fig. 10, a stop 56 carried by one of the ears 50 serving to limit the movement of the dog beyond the point indicated by dotted lines in Fig. 10.

Instead of throwing the pointer back to zero, in the manner described, this can be obviated by employing a sliding price list $37^a$ which will cover the opening 37 in the drum case, as clearly shown in Fig. 11, and the pointer 30 may be set relatively to this list without returning it to 1.

Secured on the dial beneath the dog is a triangular shaped lug 57 with which the toe of the dog 52 normally contacts. In order to make the spring 46 operative to return the index hand to its zero position, it is necessary that the toe of the dog shall be brought beneath the toe of the spring 46 and to accomplish this result the dog is moved from the position shown in full lines in Fig. 10 to that shown in dotted lines, whereupon the spring will slip over the toe, and be held there until the hand is released, whereupon, by the toe contacting with the lug, the spring will again be released. In order to limit the return movement of the hand, an L-shaped stop 58 is employed, which is pivoted between two ears 59 disposed on the outer side of the dial, one of these ears having combined with it a spring 60 that operates normally to retain the stop in the position shown in Fig. 10. By this arrangement it will be seen that when the hand is moved, counter-clockwise that the stop will not offer any obstruction to its movement, as it will be tripped by the hand, thus to allow the latter to move freely.

In operation, when the number of yards to be purchased has been decided upon, say ten yards, at five cents a yard, the index hand is moved from zero to 1, and the pointer 39 is shifted to bring its point over 5, whereupon the index hand is released and is automatically returned to zero. A length of the cloth is now drawn off and passed around the reel E and the crank F is turned until the alarm is sounded, whereupon the operator will know that the desired length has been measured and upon observing the price scale, it will be seen that the pointer 39 indicates fifty cents, the total price of the fabric measured. Of course, this latter is a very simple calculation but the same rule obtains even where the price of goods is not in integers of five.

The improvements herein defined are simple in character but will be found thoroughly efficient for the purposes designed and will result in the presentation of an apparatus that will be thoroughly reliable and accurate in measuring and indicating the price of the article sold.

What is claimed is:

1. In a machine of the class described, a revoluble price scale, a tension roll, a graduated dial, an index hand movable over the dial, means for transmitting motion from the tension roll to the index hand, a pointer coacting with the price scale and shiftable with relation thereto, means for setting the index hand from zero to 1, and means for automatically returning the index hand to zero when the machine is set.

2. In a machine of the class described, a revoluble price scale, a tension roll, a graduated dial, an index hand movable over the dial, means for transmitting motion from the tension roll to the index hand, a pointer coacting with the price scale and shiftable with relation thereto, means for setting the index hand from zero to 1, means for automatically returning the hand to zero when the machine is set, and means to check the hand at zero.

3. In a machine of the class described, a revoluble price scale, a tension roll, a graduated dial, an index hand movable over the dial, and provided with a disk having orifices corresponding in number to the graduations on the dial, means for transmitting motion from the tension roll to the index hand, a pointer coacting with the price scale and shiftable with relation thereto, a signaling device embodying an arm exposed exteriorly of the dial, a pin engaging the orifices of the disk to actuate the signaling mechanism when a predetermined length of material has been measured, and means for preventing rearward movement of the price scale.

4. In a machine of the class described, a revoluble price scale, a tension roll, a graduated dial, an index hand movable over the dial, means for transmitting motion from the tension roll to the index hand, a pointer coacting with the price scale and shiftable with relation thereto, a spring normally holding the hand at zero, a dog for releasing the spring to permit the index hand to be moved to 1, the spring serving automatically to return the hand to zero, and means for positively checking the hand at this point.

In testimony that I claim the foregoing as my own, I have hereto affixed my signature in the presence of two witnesses.

EUGENE A. LUSTER.

Witnesses:
W. P. POPE,
R. BRANDT.

---

Copies of this patent may be obtained for five cents each, by addressing the "Commissioner of Patents, Washington, D. C."